UNITED STATES PATENT OFFICE.

WALTER R. EMIG, OF TOLEDO, OHIO, ASSIGNOR OF ONE-HALF TO HARRY S. BERGEN, OF TOLEDO, OHIO.

RUST-PROOFING COMPOSITION AND PROCESS OF MAKING SAME.

1,263,395.

Specification of Letters Patent. Patented Apr. 23, 1918.

No Drawing. Application filed July 3, 1916. Serial No. 107,275.

*To all whom it may concern:*

Be it known that I, WALTER R. EMIG, a citizen of the United States, residing at Toledo, county of Lucas, and State of Ohio, have invented certain new and useful Improvements in Rust-Proofing Composition and Processes of Making Same, of which the following is a specification.

My invention relates to a coating material for iron and the like which is strongly adherent, durable and weatherproof and will protect the surface of iron, etc., to which it is applied for a very extended period from the action of the air and other oxidizing influences. In the following specification I have described in detail the preferred ingredients and proportions thereof and also the preferred manner of compounding the ingredients so as to secure the most satisfactory composition for the purpose. It is to be understood, however, that the specific disclosure is for the purpose of exemplification and that my invention in its broader aspect is not limited either to the particular ingredients, proportions or method of compounding specifically described but equivalent materials may be used the proportions and the method of compounding varied without departing from the scope of the invention as set forth in the following claims.

The materials which I preferably employ and the preferred proportions thereof are as follows:

| | |
|---|---|
| Gray iron filings | ⅛ oz. avoirdupois |
| Strong commercial phosphoric acid (which may have a strength of about 88%) | ¼ oz. liquid measure |
| Burgundy pitch | 1¼ oz. avoirdupois |
| Boiled China wood oil | 2 oz. liquid measure |
| Turpentine | 8 oz. liquid measure |

In preparing my improved rust-proof composition from the above ingredients the iron filings are mixed with the phosphoric acid to form a paste, the pitch is first melted and the boiled China wood oil is added thereto, while the pitch is being constantly stirred and heated and when the boiling temperature is attained the mixture of paste formed by the iron filings and phosphoric acid is added to the mixture. The batch is stirred constantly until effervescence ceases. If an air drying coating is desired two ounces or so of any well-known drier, litharge, or the like, may be added. After the above components have been brought together and the liquid has become quiet the turpentine is stirred into the same and the mixture is further agitated. It is then allowed to cool and settle and is ready for use.

I claim:

1. A composition of matter for use as a rust-proof coating comprising phosphate of iron, pitch and a drying oil.

2. A composition of matter for the purpose described formed by mixing finely divided iron and phosphoric acid and adding thereto pitch and a drying oil.

3. A composition of matter for the purpose described comprising phosphate of iron, Burgundy pitch and a drying oil.

4. A composition of matter for the purpose described comprising phosphate of iron, pitch and China wood oil.

5. A composition of matter for the purpose described comprising phosphate of iron, Burgundy pitch and boiled China wood oil.

6. A composition of matter for the purpose described comprising the following ingredients in the proportions named, gray iron filings ⅛ ounce avoirdupois, strong commercial phosphoric acid ¼ ounce liquid measure, Burgundy pitch 1¼ ounces avoirdupois, China wood oil two ounces liquid measure and turpentine 8 ounces liquid measure.

7. A process of forming a rust-proofing composition which consists in forming a paste of finely divided iron and phosphoric acid, melting pitch and a drying oil and adding thereto the product of the iron and phosphoric acid.

8. A method of forming rust proofing composition which consists in melting pitch and adding thereto an oil raising the temperature of the mixture to the boiling point and adding phosphate of iron.

9. A method of making a rust-proofing composition which consists in forming a mixture of finely divided iron and phosphoric acid, melting pitch, adding boiled China wood oil thereto, raising the temperature of the mixture of pitch and oil to the boiling point, adding thereto the mixture of finely divided iron and phosphoric acid and stirring the mixture until effervescence ceases.

WALTER R. EMIG.

Witnesses:
  E. M. BERGEN,
  R. GELOW.